US007929951B2

(12) United States Patent (10) Patent No.: US 7,929,951 B2
Stevens (45) Date of Patent: Apr. 19, 2011

(54) SYSTEMS AND METHODS FOR STORAGE OF USER INFORMATION AND FOR VERIFYING USER IDENTITY

(76) Inventor: Lawrence A. Stevens, New York, NY (US)

( * ) Notice: Subject to any disclaimer, the term of this patent is extended or adjusted under 35 U.S.C. 154(b) by 834 days.

(21) Appl. No.: 10/325,678

(22) Filed: Dec. 19, 2002

(65) Prior Publication Data

US 2004/0014457 A1 Jan. 22, 2004

Related U.S. Application Data

(60) Provisional application No. 60/342,574, filed on Dec. 20, 2001.

(51) Int. Cl.
*H04M 3/42* (2006.01)
(52) U.S. Cl. .................. 455/414.1; 455/415; 455/456.3; 713/186
(58) Field of Classification Search ............... 455/414.1, 455/414.2, 414.3, 415, 557, 558
See application file for complete search history.

(56) References Cited

U.S. PATENT DOCUMENTS

| | | | |
|---|---|---|---|
| 4,173,016 A | 10/1979 | Dickson | |
| 4,348,740 A | 9/1982 | White | |
| 4,348,744 A | 9/1982 | White | |
| 4,993,068 A | 2/1991 | Piosenka et al. | |
| 5,086,394 A | 2/1992 | Shapira | |
| 5,229,764 A | 7/1993 | Matchett et al. | |
| 5,615,277 A | 3/1997 | Hoffman | |
| 5,686,765 A | 11/1997 | Washington | |
| 5,862,223 A * | 1/1999 | Walker et al. ................... 705/50 |
| 5,878,416 A | 3/1999 | Harris et al. | |
| 5,884,270 A * | 3/1999 | Walker et al. ..................... 705/1 |
| 5,920,845 A | 7/1999 | Risemberg | |
| 5,950,200 A * | 9/1999 | Sudai et al. ....................... 707/9 |
| 5,963,951 A | 10/1999 | Collins | |
| 6,009,333 A | 12/1999 | Chaco | |

(Continued)

FOREIGN PATENT DOCUMENTS

FR 2 778 995 11/1999

(Continued)

OTHER PUBLICATIONS

"*Biometrics Targeted for Wireless Devices*", Biometric Digest, Aug. 2000, p. 4, col. 1.

(Continued)

*Primary Examiner* — Kent Chang
*Assistant Examiner* — German Viana Di Prisco
(74) *Attorney, Agent, or Firm* — Moore & Van Allen PLLC; W. Kevin Ransom

(57) ABSTRACT

Systems and methods are provided for maintaining user profile information and allowing for biometric verification of the user's identity. The user stores or links to personal, financial, etc. information in a web page. The user can limit the types of information that is available to others. The information can be downloaded to a portable device. The information can be used for financial transactions, where the financial information is transmitted to a web site, an ATM, credit card machine, etc. for financial approval. The information can also be used to find other users with similar interest. The user stores selected characteristics that they would like to find in other users, which are compared with other user's profiles. Matching users are aided in locating one another, where they may then prove their identity to each other by biometrically verifying that they are the owner of the user profile.

16 Claims, 7 Drawing Sheets

U.S. PATENT DOCUMENTS

| | | | |
|---|---|---|---|
| 6,016,476 | A | 1/2000 | Maes et al. |
| 6,020,810 | A | 2/2000 | Har-Even |
| 6,041,410 | A | 3/2000 | Hsu et al. |
| 6,052,122 | A | 4/2000 | Sutcliffe et al. |
| 6,092,192 | A | 7/2000 | Kanevsky et al. |
| 6,112,181 | A * | 8/2000 | Shear et al. ............... 705/10 |
| 6,150,937 | A | 11/2000 | Rackman |
| 6,219,439 | B1 | 4/2001 | Burger |
| 6,249,282 | B1 | 6/2001 | Sutcliffe et al. |
| 6,263,447 | B1 * | 7/2001 | French et al. ............... 726/5 |
| 6,272,467 | B1 | 8/2001 | Durand et al. |
| 6,317,544 | B1 | 11/2001 | Diehl et al. |
| 6,571,279 | B1 | 5/2003 | Herz et al. |
| 6,695,206 | B2 * | 2/2004 | Ross ............... 235/380 |
| 6,898,299 | B1 * | 5/2005 | Brooks ............... 382/115 |
| 7,246,243 | B2 | 7/2007 | Uchida |
| 2001/0034766 | A1 | 10/2001 | Morimoto |
| 2001/0055950 | A1 * | 12/2001 | Davies et al. ............... 455/41 |
| 2002/0010862 | A1 | 1/2002 | Ebara |
| 2002/0060243 | A1 * | 5/2002 | Janiak et al. ............... 235/382 |
| 2002/0103792 | A1 * | 8/2002 | Blank et al. ............... 707/3 |
| 2002/0107008 | A1 * | 8/2002 | Hendrey et al. ............... 455/416 |
| 2002/0120870 | A1 * | 8/2002 | Susaki et al. ............... 713/201 |
| 2003/0046237 | A1 * | 3/2003 | Uberti ............... 705/44 |
| 2003/0066882 | A1 * | 4/2003 | Ross ............... 235/380 |
| 2004/0247089 | A1 * | 12/2004 | Vishik et al. ............... 379/88.01 |
| 2006/0069749 | A1 * | 3/2006 | Herz et al. ............... 709/219 |
| 2007/0234067 | A1 * | 10/2007 | Nanavati et al. ............... 713/186 |

FOREIGN PATENT DOCUMENTS

| | | |
|---|---|---|
| JP | 63253480 A | 10/1988 |
| JP | 11262059 | 9/1999 |
| JP | 2001067400 A | 3/2001 |
| JP | 2001175718 A | 6/2001 |
| JP | 2001243345 A | 9/2001 |
| JP | 2001-325549 A | 11/2001 |
| JP | 2001-331454 A | 11/2001 |
| JP | 2001331453 A | 11/2001 |
| JP | 2001331454 A | 11/2001 |
| JP | 2001344372 A | 12/2001 |
| WO | WO 97/32284 | 9/1997 |
| WO | WO 99/13434 | 3/1999 |
| WO | WO 99/56429 | 11/1999 |
| WO | WO 00/22558 | 4/2000 |
| WO | WO 00/22860 | 4/2000 |
| WO | WO 00/22860 A1 | 4/2000 |
| WO | WO 01/15480 A1 | 8/2000 |
| WO | WO 00/79366 | 12/2000 |
| WO | WO 01/01224 A1 | 1/2001 |
| WO | WO 01/63386 A1 | 2/2001 |
| WO | WO 01/15480 A1 | 3/2001 |
| WO | WO 01/33429 A2 | 5/2001 |
| WO | WO 01/63386 | 8/2001 |

OTHER PUBLICATIONS

International Search Report, EPO, mailed Sep. 6, 2004.
Office Action dated Nov. 11, 2008 as issued by the Japanese Patent Office.
Office Action dated Sep. 29, 2009 as issued by the Korean Intellectual Property Office.
Office Action dated Jun. 2, 2009 as issued by the Japanese Patent Office.

* cited by examiner

SYSTEMS AND METHODS FOR STORAGE OF USER INFORMATION AND FOR VERIFYING USER IDENTITY

CROSS-REFERENCE TO RELATED APPLICATIONS

This application claims priority from U.S. Provisional Patent Application No. 60/342,574, filed Dec. 20, 2001, entitled METHOD AND SYSTEM FOR MATCHING ELECTRONIC USER PROFILES the contents of which are incorporated by reference herein in their entirety.

BACKGROUND OF THE INVENTION

1. Field of Invention

The present invention relates generally to systems and methods for storing information related to a user and allowing for biometric verification of the user's identity.

2. Description of Related Art

In the past few years, there has been a significant increase in the use of portable electronic devices such as personal digital assistants (PDAs), cell phones, and lap top computers. Users of these devices have come to rely on them for many of their daily activities. For example, many people use PDAs to maintain their activity calendars, address books, etc. Many of these same features are now being implemented into cell phones. As users have become more accustomed to the use of these systems, there has been a desire to add more functionality to these systems. One area of interest is in the storage of user financial and medical records. Specifically, currently most people are required to carry various forms of identification and financial information with them in the form of identification cards, insurance cards, credit cards, etc. There is the potential for these various cards to be lost, misplaced, or stolen. Further, users had typically rather have one source for retrieval of their information, as opposed to maintaining the various separate forms of identification and records.

Although centralized information storage has been a desired goal, there have been several issues with regard to security for such information. While users would prefer one source containing all of their personal information, such a system also increases the risk of identity theft by others. As such, there is a need for a system and method that allows for centralized storage of information having mechanisms to maintain data security.

An additional problem with use of electronic systems to maintain personal and financial data concerning a user is verification of the user. Specifically, with more traditional forms of identification, such as driver's licenses and credit cards, physical attributes such as a photo or signature can be used to verify that the holder of the identification card is in fact the owner of the card and the information related thereto. Such verification is much more difficult with an electronic system. In such systems, mechanisms are needed that allow a user to verify to others that the information being presented is their information.

As mentioned, PDAs and cell phones are currently used for storage of calendars, addresses, and phone numbers. There are, however, other potential uses of these systems that have yet to be developed. Specifically, many people wish to contact other people who have similar interests, who have something they want, and/or who may want something they have. For instance, one may wish to locate a person with whom they can share their similar interests or build a relationship. In addition, one may wish to locate a person who has emergency training and can help in an emergency situation or a person who wishes to buy or sell a certain item.

Matching people who are located in the same general area and who have compatible interests is a difficult task because people must physically or audibly convey their interests to others and ask if they share the same interests. This process is made even more difficult when attempting to limit the number of people who receive the information and inquiry to those who are interested in the information. The task of matching compatible people or people who have similar interests has been solved conventionally through systems that utilize wireless devices for exchanging certain personal data between users or computer-based systems that utilize the Internet and personal computers for exchanging personal data stored in computer databases.

For example, wireless devices such as pagers or cordless phones in which a user profile may be stored or that may interface with a stored user profile via various wireless communication means have been designed for exchanging certain personal data between users. The wireless devices, in operation, transmit and receive user profile information to and from the general area surrounding the device via radio or telephone communication in order to find other matching profiles. A comparison of the stored profile and the received profiles may be performed by a processor in the wireless device or at a remote location that is in communication with the wireless device. While these systems provide for wireless communication of a user profile and interests in the area surrounding the user, there are some drawbacks to current wireless device systems. Specifically, the profiles stored or accessed by these wireless devices are specific profiles for the particular users that contain only certain general personal information about the users. In addition, although a user can choose not to enter certain information into his or her profile, all of the information stored in the profile is accessible to other users when it is transmitted to the surrounding area. Thus, the user cannot store other personal information in their personal profile that only the user may access. Another drawback of this type of system is that there is no way to prevent someone who steals or finds the wireless device from using the wireless device representing himself as the owner of the user profile transmitted by the device. Furthermore, there is no way for users to know if the information stored in other users' profiles is true.

Another type of system for exchanging personal information among users is a computer-based system that utilizes the Internet and personal computers for exchanging personal data stored in databases. Typically, these computer-based systems involve the users entering their personal information into a database on a server via personal computers connected to the Internet and web pages. All of the users of the system may search the personal information database(s) to find another user having the characteristics they desire by using particular search criteria. Alternatively, the system may perform a comparison of all of the users' personal information, determine the best matches among the users, and present contact information to the compatible users. These computer-based systems, however, generally do not provide a wireless device that the users may carry with them to transmit their information to other users in the general area such that users may not immediately meet compatible people. In addition, this system, like the wireless device system described above, does not permit a user to store other personal information in the database that only the user may access. The only way for a user to limit what the other users may access is to choose not to enter certain information into his profile. Furthermore, this system also does not provide a way for users to know if the information stored in other users' profiles is true.

One type of system that permits users to store all of their personal information, including financial, medical and other records, also permits users to choose the portions of their personal information that they wish to allow others to access. This system includes handheld wireless devices that may access and/or store the users' personal information, and transmit and receive information to and from others or may initiate a consumer transaction via wireless communication. Furthermore, these systems may include biometric verification capability, such that the user of the handheld device must verify he is the owner of the information in or accessible by the device before using the device for any purpose. These systems, however, do not permit users to include in their stored personal profiles or personal information the profiles of other users that they wish to locate. As such, these systems do not include functionality to compare various user profiles to find matches and signal to the user via the handheld device when a match is found.

BRIEF SUMMARY OF THE INVENTION

The system and method of the present invention provide several advantages over prior art systems. Specifically, the system and method of the present invention provide biometric verification (including, but not limited to, retina or fingerprint scanning, voice or DNA recognition) using an electronic device (including, but not limited to, a computer, mobile phone, personal digital assistant, or pager) to link people to their electronic identity/profile (including, but not limited to, a personal description, medical, legal, work, police, financial, religious records and any other desired affiliation) for the purpose of exchanging and/or matching verified information and/or desired profile characterizations.

More specifically, the system and method of the present invention allows a user to enter various information concerning themselves into a web-page for access and display via the Internet or an intranet. The user may include general information about themselves, such as their occupation, background, etc. The user may also enter or provide links to information related to their financials, criminal records, medical, and religious records. The user can segregate the information such that only certain individuals can gain access to certain records. The web page may also include a personal section that allows the user to input certain characteristics of themselves. These characteristic may describe the user, such as ethnicity, body type, hair and eye color, etc., and it may describe the user's hobbies, businesses in which the are engaged, etc. The user may also enter certain characteristics that they are looking for in others. This may be match-making characteristics or it may be characteristics related to a hobby of interest, etc.

The user can make certain portions of this information accessible via the Internet so that other users may view their information. In a match-making environment, other users may view the user's information to see if there are common interest. Further, the a central processor may receive the selected desired characteristics input by each user and compare these desired characteristics with each user's information to identify user's having common interests. In a financial transaction, an entity interested in doing business with the user may be allowed access to the user's stored or linked financial information for the transaction.

Importantly, the system and method of the present invention further provide a portable device for storing either all or portions of the user's information or for accessing via the Internet the information stored or linked to in the user's web page. The portable device can be carried by the user and used for match-making, finding others with common interest either business or personally related, and for performing various business and financial transactions.

In a match-making or finding others with common interest setting, the portable device is designed to transmit selected portions of these user's profile to the general area surrounding the user. Other users receive this information where it is processed, while the user also receives information from the other users. The received user profile information is compared to the user's selected preferences. If a particular user meets the desired characteristics, an indication of a match is made to the user. Different methods may be used to then meet the user matching the criteria. The portable device may include a GPS that allows for the user's pinpoint each other's location. The portable device may use a tracking signal that is transmitted by both user's portable devices; the signal strength of which is used to direct the users toward each other's location. The system may also include text messaging capability allowing the users to communicate with each other.

Besides match-making this system may be used to locate others having a similar interest, such as a user who is interested in purchasing coins looking for a coin dealer. The system may also be used for emergency purposes. User's having medical training may include this information in their system. If another user is experiencing a medical emergency, the user can push a panic button, which causes their device to transmit an emergency signal. This signal will be sent to the area surrounding the user. If a user in the area has medical training, their device will receive the emergency signal and alert them of the problem so that they may come to the user's attention.

The portable device may also be used for financial and other transactions. Specifically, the portable device may transmit the user's financial information to an ATM, credit card machine, etc. The financial information can then be used for a transaction.

An important aspect of the present invention is verification of the user. Specifically, in each of the above settings, it is important to verify that the holder of the device is the actual person associated with the information stored therein. For this reason, the system of the present invention includes security mechanisms to ensure to others that the presenter of the information is indeed the owner of the information. Specifically, the system and method of the present invention include a biometric scanner and storage for maintaining a stored and verified biometric of the user. The user prestores a biometric of themselves that is verified as their biometric. This biometric is stored on their own device. To verify to other users that the user owns the information in the device, the user scans their biometric with the scanner on the device. The scanned biometric is compared to the stored and verified biometric. If there is match, the device indicates the verification either visually by lighting a verification indicator on the device or by transmitting a verification signal to another user.

In an alternative or further embodiment, the user's biometric may be stored on other users' devices, if they are for example, in a network where all other user's biometrics are downloaded and saved to each user. In this instance, the other user may also require the user to have their biometric scanned by and verified by the other user's device. This has the added feature of protecting against a user tampering with the biometric stored on their own device by requiring them to also be verified by the other user's device.

The various aspects mentioned above are provided in greater detail below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1A:
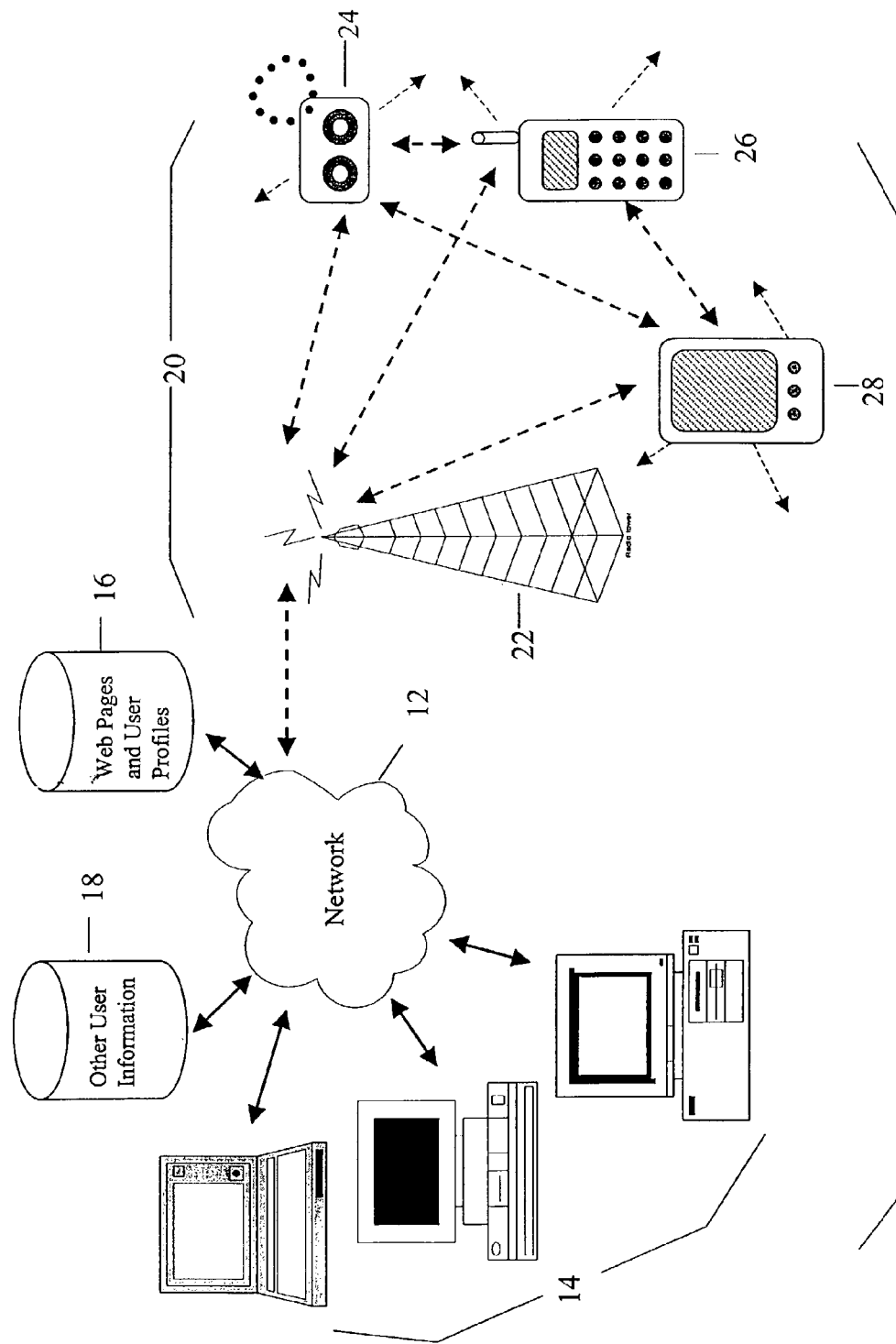
FIG. 1A is an operational block diagram illustrating the environment and various applications in which the system and method of the present invention may be implemented.

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The method and system of the present invention generally include users entering their personal profiles into web pages via computer-based systems in communication with a network, and storing their profiles in one or more servers in communication with the same network. These personal profiles may include any type of information regarding the users, such as physical descriptions, interests, financial information, and/or medical records, and the profiles also may specify the type of profile sought in other users. Furthermore, users may specify which portions of their profile they wish to share with other users and which portions they wish to keep private. The users then may access their personal profile via portable wireless user devices and a wireless network that has access to the network that is in communication with the servers that store the user profiles.

The portable user devices may be any type of portable wireless device, such as key chains, cellular phones, pagers, and/or personal digital assistants, and a particular user's portable device may store or access that user's profile from the remote server. The portable user device may transmit its user profile to the surrounding area, receive other users' profiles and compare the profiles for a variety of purposes. For example, one user may sell gold coins and wish to locate another user that would like to buy gold coins, such that a comparison of the users' accessible profiles would create a match. A further example is that one user may wish to find another user with similar personal interests, and a comparison of one user's sought profile with another user's accessible profile would create a match if the interests specified therein are similar. The portable user devices also may have a "panic" button, such that a user in need of help in an emergency may depress the panic button and locate other users in the surrounding area that can assist, such as those users with accessible user profiles that include police, medical or any other type of emergency training. The portable user devices include an indicator for signaling to the users when a match is found. The signal may be visual, vibratory, audible and/or any other type of signal that indicates a match to the users.

Furthermore, either or both the portable user device and the user's computer incorporate biometric verification, such as retina or fingerprint scanning, voice recognition, DNA or any other type of biometric verification, functionality for security and validation purposes. Thus, matching users may verify to each other by using the scanner and stored biometric on their own device or the scanner and stored biometric on the other user's device that they are the owners of their device and the profiles stored thereon to thereby ensure that the person they are meeting has not stolen or found another user's portable device. Additionally, users may biometrically verify certain types of personal information in their profiles such that other users are ensured the information is true.

Because the user profiles may include any type of electronic information or records and because all or portions of the information may be completely private, the profiles can be a central repository of electronic information for the users. As such, users may access their personal profile via their portable user device to perform transactions, financial or otherwise, that require the information stored in their profiles. The biometric verification functionality of the portable user devices ensure the security of the private information stored in the user profiles and of the transactions because users may not access their profiles, particularly the private portions of their profiles, or execute transactions until the biometrics of the users are verified. Thus, the portable user devices may be utilized in any instance in which a biometric proof of identity is associated with any exchange of information, such as use of a credit card, making a phone call, or any other type of information exchange.

Referring to FIG. 1A, the system 10, according to one embodiment of the present invention, includes a network 12, such as the Internet, Wide Area Network (WAN), Local Area Network (LAN), etc., at least one server, and at least one personal computer 14. The server(s) is/are in communication with the network 12 and may include a server 16 that stores web pages and user profiles, and at least one server 18 that stores other user information. Alternatively, the web pages and the user profiles may be stored on separate servers. Furthermore, the user profiles may be stored in databases located on one or more servers. The personal computers 14 are also in communication with the network 12 and able to access the web pages stored in server 16. The personal computers 14 may receive the user profile data that the users enter into the web pages, and the user profile data may be stored in server 16. Additionally, a personal computer 14 may be associated with the biometric of a particular user. As such, the web pages may also be stored in the personal computer and the user may store their profile data in the personal computer and only that particular user may access the personal computer after biometric verification by the computer. The personal computer also may perform continuous biometric verification such that another person may not access the information stored in the personal computer after an initial biometric verification. Each user profile stored in server 16 and/or a personal computer associated with the biometric of a particular user is associated with the biometric(s) of the particular user and a unique ID number that represents the particular user. The server 16 or any other network server may also contain a secure look-up table or list that correlates the biometrics and unique ID numbers with the profile of the particular user, such that when a user transmits information, the system 10 can immediately associate that information with the user's profile by looking up, in the table or list, the unique ID number and biometric associated with the transmitted information.

The web pages may prompt users to enter certain information, but the web pages also allow the users to enter any type of information in their personal profile that they desire. Additionally, the user may include links to any other electronic user information that resides on servers that are in communication with the network 12. For example, the user profile data may also include the location, such as the IP address or domain name, of other user information, such as banking records, medical records, criminal records, driving records, etc. Users also may verify certain types of personal information, such as by associating the information with their biometric. For example, users may associate their biometric with their medical records, their salary, or with their name in an organization's membership list and have it verified by someone who may vouch for the authenticity. Users then may include links to the databases or servers containing the verified information to add credibility to the information contained in their profiles.

The web pages also permit users to select the portion(s) of their profiles that they will allow other users to access. Thus, users may store completely private information in their profiles for their own purposes of having a common repository for all of their personal information. In addition, users may set up multiple profiles specifying different levels of access to their personal information, such that they may select the profile they will allow others to access on a case-by-case basis. For example, for purposes of exchanging personal information with another user that they are very interested in meeting, the user may set up one profile that allows other users to access only the information that they view as positive information regarding themselves. Thus, users may tailor multiple profiles according to what they believe other users are seeking, and may choose the profile to allow other users to access depending upon the environment, situation, or application.

Users also may specify the type of profile or profiles sought in other users via the web page that may also be stored in each user's profile. For example, if certain users sell gold coins, the users may specify that they wish to find other users interested in buying gold coins. Another example may be that users specify the type of interests they are seeking in other users in order to share the interests or get to know the other users better. Any information users enter and store in their profiles may be changed at any time by the users via the personal computers 14 in the same manner as described hereinabove and/or via the portable user devices, as described hereinbelow.

In specifying the profiles sought in other users, users may assign weights to certain characteristics such that when a user's sought profile is compared to other users' profiles, a score is obtained. Any type of weighting program, algorithm, or matrix known to those skilled in the art may be utilized. For example, weights from zero to ten may be assigned to certain characteristics, zero representing an unacceptable characteristic and ten representing a perfect match for that characteristic. Thus, if a user is seeking a person that is six feet tall, but would not mind a few inches deviation, the user may assign six feet a weight of ten and lower weights to other acceptable heights, then the heights omitted default to a weight of zero. Alternatively, if a user is seeking a person that is six feet tall only, the user assigns a weight of ten to six feet and any other height will be assigned a weight of zero. Weights may be assigned for any type of characteristics and users also may specify that verified information is assigned a higher weight than non-verified information. Furthermore, users may set up multiple sought profiles, varying the type of characteristics sought, whether the characteristic must be verified and/or the weights assigned. User may then choose, on a case-by-case basis, the particular profile sought depending upon the particular environment, situation or application.

Once stored, the user may use the information for many purposes. For example, the user may perform various on-line financial transactions in which the stored or linked financial data is used. An important aspect of this embodiment of the present invention is verification. Specifically, as mentioned, the computer may have associated therewith a biometric scanner, which can be located in the screen, mouse, mouse pad, keyboard, etc. of the user's computer. The user may have stored on the computer a verified biometric of themselves. Further or alternatively, the individual with whom the user is conducting the transaction with may also have a verified copy of the user's biometric stored in their system. When a user initiates a transaction, the scanner will scan the user's biometric and the user's own computer may compare it to the stored biometric and verify to the individual with whom the user is conducting the transaction that the user is the owner of the financial information. Further or alternatively, the user's scanned biometric may be sent to the other user's computer where it can be compared with the pre-verified user biometric stored on the other individual's computer to thereby verify the user. This added or alternative approach reduces the risk that the user has tampered with the pre-verified biometric stored on their own computer by requiring them to verify their scanned biometric with that stored on the other user's device.

One example of this may be on-line banking, where to ensure that the person accessing the account is the owner of the account. In this instance, the user's biometric is scanned by a scanner at the user's location and sent to either a central processor or the remote user. The central processor and/or the remote user has a prestored verified biometric for the owner of the account. If the scanned biometric and verified biometric match, the user is the owner of the account. A similar scenario could be used for example in an on-line auction program, where users all submit a verified biometric, which is either stored at a central computer and/or at each user's computer. When a transaction is occurring between users, each user will have their biometric scanned and sent to either the other user or the central processor where they can be verified by comparison to the stored pre verified biometrics.

In addition to financial and other business transactions, the stored user profile can be used in a network application for match-making and/or finding others with similar interests. Specifically, a plurality of users may subscribe to a service, whereby their profiles and preferences are accessible by a central processor. The central processor may compare the users' profiles to other users' preferences and determine like interest. These users are then notified concerning matches and may be provided with the matching user's information. Similar to the financial transaction scenario, the present invention allows for user verification of their profile information by using scanners that scan the user's biometric for comparison to a pre-verified biometric of the user stored on either or all of the user's own computer, the central processor, or the other users' computers.

The network 12 is also capable of communicating with a wireless communication network 20, such as a cellular, RF, or other type of wireless network or combination of wireless networks, via any method known to those skilled in the art. The wireless network 20 includes a tower 22 that transmits and receives signals to and from the network 12, and multiple portable user devices that transmit and receive signals to and from each other, and to and from the tower 22. The portable user devices may be any type of device capable of wireless communication and it may be a device that is dedicated to the system 10 or a device that is also capable of other functions. For example, the portable user device may be a key chain device 24, a cellular phone device 26, and/or a Personal Digital Assistant (PDA) 28. Regardless of the type, the portable user device is associated with the same unique ID number and biometric as the user profile that is stored in server 16, a personal computer that is associated with the user's biometric, or any other secure database or server that is in communication with the network 12.

Figure 1B:
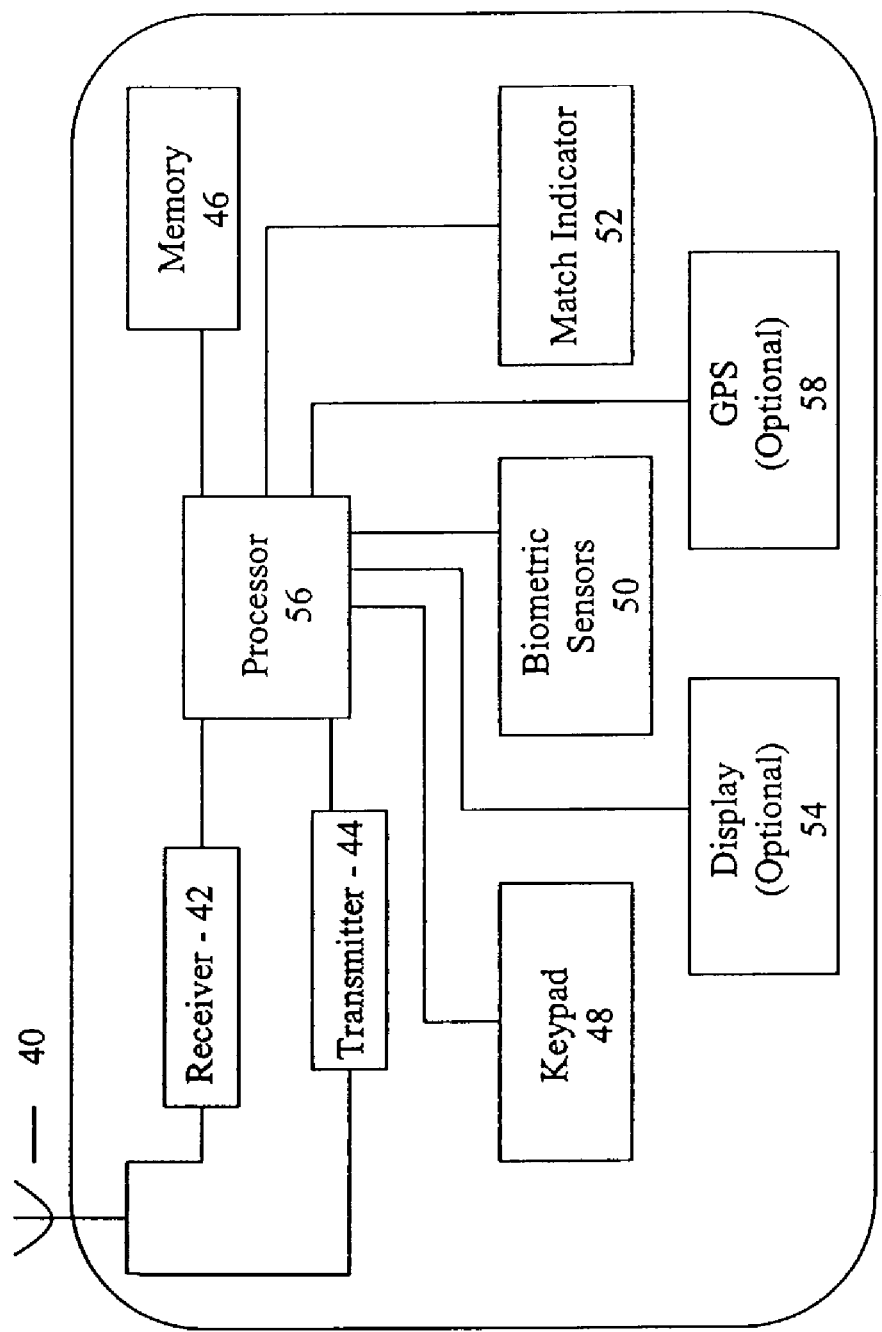
FIG. 1B is an operational block diagram of a portable device for storing and transmitting user profile information according to one embodiment of the present invention.

FIG. 1B illustrates the components that may be included in the portable user devices. The portable user devices may have at least one antenna 40, a receiver 42, a transmitter 44, a memory 46, a keypad 48 with at least one key, at least one biometric sensor 50, a match indicator 52, an optional display 54, an optional Global Positioning System (GPS) 58, and a processor 56. The antenna 40 may be any type of reception and transmission component located along the exterior of the device, such as an infrared sensor, or extending from the exterior of the device. The receiver 42 and transmitter 44, therefore, receive and transmit, respectively, signals via the antenna 40 or other type of transceiver. The signals transmitted to and from the device are processed by the processor 56.

Users may select the range over which their portable user devices receive and transmit signals. For example, users may set the range of transmission and reception of their portable user devices for the area of a room if they are seeking other users who may help them or have compatible interests in that room. Furthermore, users may set the range of transmission and reception of their portable user devices to a larger area if they are outdoors and are seeking other users in the general area who may help them or have compatible interests. In addition, users may set their portable user devices to transmit a signal to a server in communication with the network 12 that indicates the users are seeking any other users who may help them or have compatible interests, regardless of their locations.

The memory 46 stores the unique ID number for the user that is also associated with the user's profile. In one embodiment of the method and system of the present invention, the profile of the user may also be stored in the memory 46 of the portable device. As such, the portable device transmits a request through the system 10 for the user profile that is associated with the unique ID number for the user. The system servers that are in communication with the network 12 are searched for the appropriate user profile and that user profile, along with the ID number, is securely transmitted to the portable user device such that only the portable user device that is associated with that ID number may receive the user profile. The appropriate portable user device then receives the user profile via the antenna 40 and the receiver 42. In this example, the processor 56 determines that the received signal is the user profile and stores the user profile in the memory 46. As an alternative to, or in addition to, storing the user profile in the memory 46 of the portable user device, the portable user device may access a portion or all of the appropriate user profile that is stored in a server or database that is in communication with the network 12 each time the user requests any type of action that involves his user profile.

The processor 56 may also include software that is capable of comparing other user profiles received by the portable user device via the antenna 40 and the receiver 42 with the user's profile, particularly the part of the user's profile that specifies the type of profiles sought in other users. As an alternative to, or in addition to, the comparison software residing in the processor 56, a server that is in communication with the network 12 may include the comparison software, which the portable user device may access. The processor 56 and/or the server may also include translation software such that user profiles written in different languages may be compared. Once the comparison software finds a match between the user's sought profile and another user's profile, a match indicator 52 of the portable user device is activated.

In one embodiment, the comparison software may compute a score for each comparison between one user's sought profile and another user's accessible profile. The score is based upon the weights assigned to the characteristics included in the user's sought profile and which characteristics the other user's accessible profile includes. The raw score based upon the weights may then be scaled to a score of one to one hundred, for example, according to any weighting and scaling method known to those skilled in the art. Users may specify in their user profiles a score under which they should not be indicated of a match. In addition, users may specify different minimum scores associated with different sought profiles. For example, if one sought profile contains only highly-weighted characteristics representing the exact characteristics sought in another user, the minimum score for that profile may be relatively high to ensure the seeking user is only notified of almost exact matches. Another sought profile may include many weights for a variety of sought characteristics and the minimum score for that profile may be low enough to ensure the seeking user will be notified if another user exactly matches one or more characteristic and is in an acceptable range for other characteristics.

The match indicator 52 may create any type of signal to indicate the match to the user, such as a visual, audible or vibratory signal. The processor 56 may also evaluate the strength of the matching user's signal, which is an indication of how far away the users are, such that the processor 56 may instruct the match indicator 52 to correspondingly signal the match to the user. For instance, if the processor 56 determines that the matching user's signal is relatively weak, representing that the users are relatively far away from each other, the processor will instruct the match indicator 52 to create a relatively weak signal to indicate the match to the user. Because the portable user devices may continuously transmit the user's accessible profile with the unique user's ID number, the matching user's profile will be continuously received by the seeking user and as the signal from the matching user gets stronger, the processor 56 may instruct the match indicator 52 to create a stronger signal. Furthermore, if the seeking user's portable user device contains a display 54, the scores of the matches with other users may be displayed to the seeking user along with the specific characteristics that matched and those that did not match. In other embodiments, the matching user may also receive the score and match information if their device also contains a display 54.

An optional GPS 58 further indicates the location of the matching user to the seeking user. The GPS 58 tracks the coordinates of the location of portable user devices containing the GPS 58. Thus, along with the user ID and user profile signals that are transmitted by the portable user device, the coordinates of the location of the portable user device may also be transmitted. Therefore, when the comparison software finds a match, it can not only indicate the match with a signal to the seeking user, but also can provide the seeking user with the exact location of the matching user, if the seeking user's portable user device has a display 54, which is also optional.

In an alternative embodiment, the portable user devices may transmit their location information and unique ID to a server that is in communication with the network 12 and the server may track the users that are in the same general area, compare their profiles, and transmit a match indication signal and/or location information of the matching user to the seeking user, if a match is found. Although the above embodiments have been described with reference to only the seeking user receiving the match indication signal and/or the location information of the matching user, the matching user may also receive the match indication signal and/or location of the seeking user in the same way. Descriptions of typical embodiments of the method and system of the present invention that further detail the functionality of the match indicator 52, the optional GPS 58 and the optional display 54 in the portable user devices are included hereinbelow.

The keypad 48 includes at least one key may provide user interaction with the portable user device. That is, users may depress a key and transmit a signal to the processor 56 that may instruct the processor 56 to perform certain functions. For example, the key may represent an "on/off" button that instructs the processor 56 to begin or end transmitting signals to and receiving signals from the other activated portable user devices in the area. The keypad 48 also may permit users to select the range of transmission and reception for their portable user devices, as described hereinabove. One embodiment of the method and system of the present invention may also include user interaction via the keypad 48 to alter their user profiles that are stored in the personal user device and/or in a server that is in communication with the network 12. For this embodiment, the personal user devices may also have the display 54, which is optional. Another embodiment of the method and system of the present invention may include a key that represents a "panic" button that, when depressed by the user, immediately searches for profiles of other users that may be able to help the user in an emergency situation, such as a police officer, doctor or any type of emergency personnel. Users may specify in their user profiles the range of the area to search when the panic button is depressed or the portable user devices may default to a pre-defined range, such as the maximum transmission range for the devices.

Finally, the biometric sensors 50 may be any type of biometric sensors known to those skilled in the art, such as voice recognition, retinal or fingerprint scan, DNA or some other biometric sensor. The biometric sensors 50 provide a security system for the portable user devices such that no one but the owner of the device and the profile stored in or accessed by the device may use the device. Thus, the memory 46 of the portable user device may store the user's biometric(s) and before the portable user device may be activated, the user must pass a biometric test via the biometric sensors 50. The biometric sensors 50 will scan or record the biometric of the user and compare that biometric to the stored biometric. If the biometrics match, the user may activate the portable user device. If the biometrics do not match, however, the portable user device cannot be activated.

In addition, after the user device is activated and if a matching user is found and physically located, the matching users may perform the biometric tests for each other such that they are ensured that the person they are meeting is the owner of the matching user profile. This verification can occur in more than one way. In a first embodiment, the user may have a pre-verified biometric stored in their device. When verification that they are the owner of the device is required, the user can scan their biometric with the scanner on the device, and the device will compare the scanned biometric to the stored biometric and indicate to another user if there is a match. In an alternative or further embodiment, the user's biometric may be stored on other users' devices, if they are for example, in a network where all other user's biometrics are downloaded and saved to each user. In this instance, the other user may also require the user to have his or her biometric scanned by and verified by the other user's device. This has the added feature of protecting against a user tampering with the biometric stored on their own device by requiring them to also be verified by the other user's device.

The processors 56 of the portable user devices may also require users to pass another biometric test if the users wish to access the private records or information contained in their user profiles, such that someone could not steal or find an activated portable user device and immediately have access to all of the information stored in or accessible by the device.

Because the users' biometrics are also stored in a server that is in communication with the network 12 and each user's biometric is associated with their profile and unique ID number, wireless biometric verification devices that are in communication with the wireless network 20 may be located in various places, such as places of business, and users may securely access their profiles via the verification devices. As such, users may enter the place without any identification and submit their biometrics to the device. The device then transmits the biometric through the system 10 to a server that is in communication with network 12. The server compares the biometric to the stored biometrics and, if a match is located, the user and/or the authorized personnel of the business or organization may access the portions of the user profile that permit execution of the desired transaction. For example, a bank may have a wireless biometric verification device, and users may enter the bank and submit their biometrics to the device. If the biometric of a user is verified, then the appropriate portions of the user's profile may be accessed by the user, or the user may authorize the bank personnel to access selected portions of the profile.

As another example, the user may have his or her credit card information stored in the device. When the user wishes to purchase an item, the user's credit card information is transmitted to a receiver on the cash register and recognized for payment of the items. The verification that the credit card information belongs to the user may occur in at least two ways. First, the user may use the scanner on the device to scan the biometric and compare it with the biometric on the device. If there is a match, the indicator will show the match, which can be verified by the salesperson similar to the salesperson verifying the signature of the holder as it appears on a conventional credit card. As a second example of verification, the user's biometric may be scanned using a scanner associated with the cash register. This scanned biometric can be compared to a biometric of the user stored in a central database accessible by the cash register such as from the credit card company or the biometric may be provided by the device of the present invention along with the financial information to the cash register, so that the cash register can compare the stored biometric with the scanned biometric to verify that the presenter of the card is the owner of the credit card information. Similar systems and methods may be employed for any like situation where verification is needed.

Figure 2:
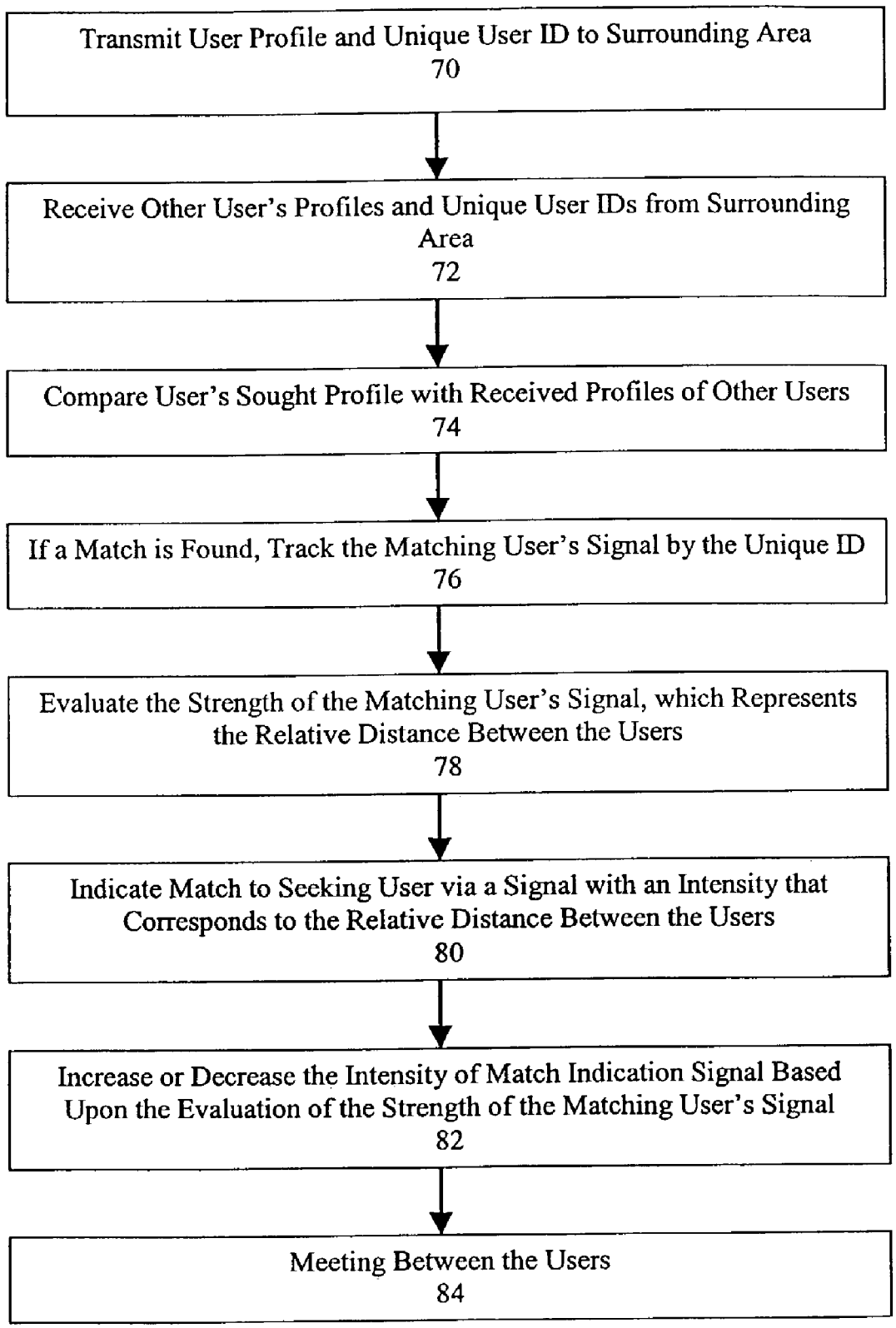
FIG. 2 is an operational diagram illustrating a method for locating user's having matches according to one embodiment of the present invention using the intensity of a search signal transmitted by the user's devices.

FIGS. 2 through 6 are flow diagrams that further illustrate advantageous embodiments of the method and system of the present invention. FIG. 2 illustrates the manner in which users that find matches for their sought profiles in other users may locate the matching users. As discussed hereinabove, users, after biometric verification, may activate their portable user devices, which enables the devices to begin transmitting their accessible profile information and unique user IDs, and receiving other users' accessible profile information and unique user IDs, (see steps 70 and 72). The received user profiles are compared with the receiving user's sought profile, (see step 74). If a match is found, the portable user device may store the matching user's unique ID in the memory 46 and the processor 56 may monitor the received signals for that ID to track the matching user's signal, (see step 76). Next, the processor 56 may evaluate the strength of the matching user's signal to assess the relative distance between the users, (see step 78). The processor 56 then may instruct the match indicator 52 to signal the match to the seeking user, and the signal intensity may correspond to the relative distance between the users, (see step 80). The processor 56 continues to evaluate the intensity of the matching user's signal and instructs the match indicator 52 to increase or decrease the intensity of the match indication signal correspondingly, (see step 82), such that the seeking user knows if the matching user is getting closer or farther away. When the processor 56 determines that the matching user's signal is intense enough to indicate that the matching user is within a relatively short distance, which may be pre-determined by the user and stored in the user's profile and/or the memory 46, the processor 56 may instruct the match indicator 52 to create a type of signal that will indicate the short distance between the users to the seeking user. The seeking user may then locate the matching user and initiate a meeting between the users, (see step 84), if desired.

Figure 3:
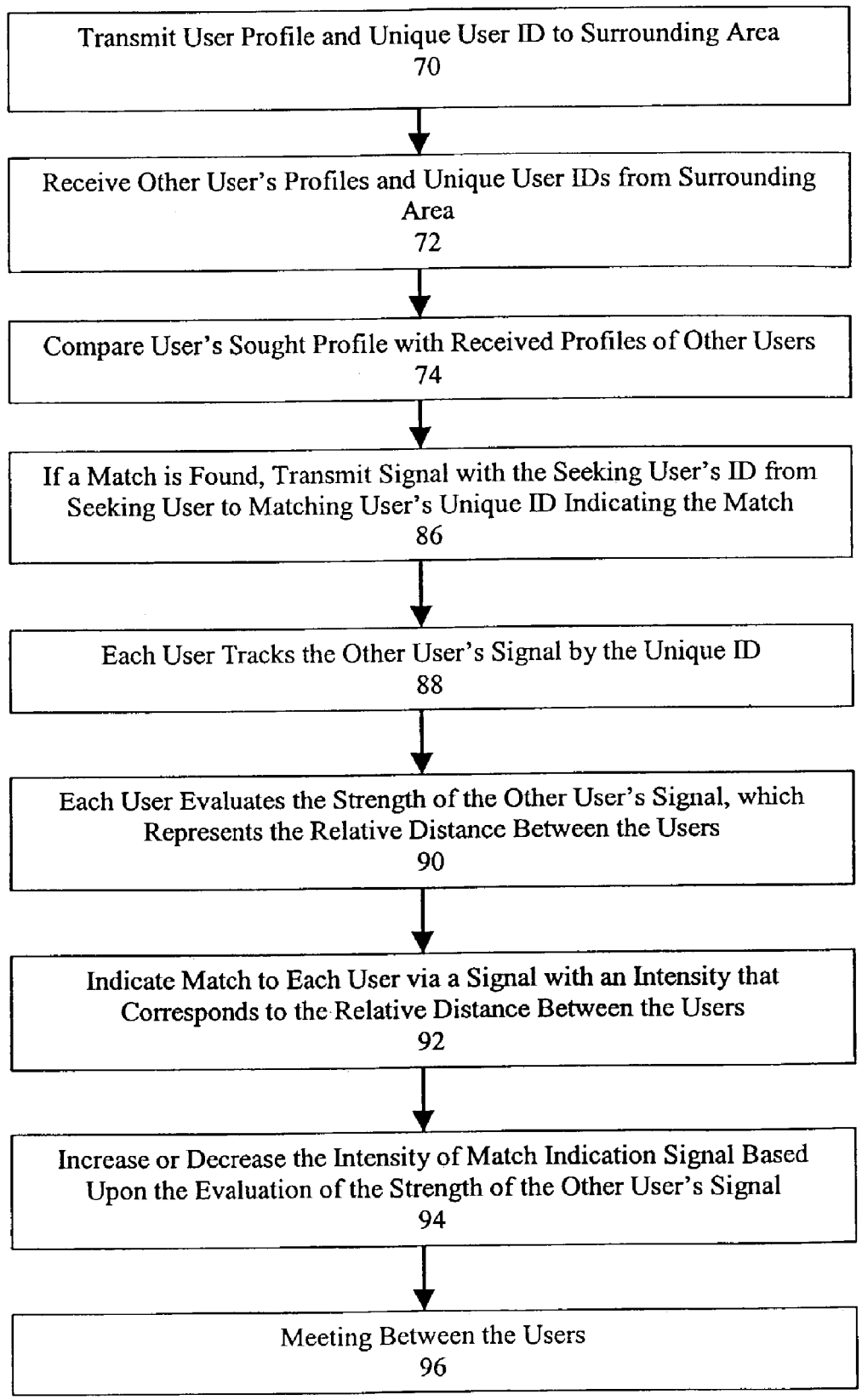
FIG. 3 is an operational diagram illustrating a method for locating user's having matches according to another embodiment of the present invention using the intensity of a search signal transmitted by the user's devices.

FIG. 3 illustrates the manner in which a seeking user and a matching user may locate each other. The first steps, 70, 72, and 74, in this embodiment are the same as described above. If a match is found, however, the portable user device of the seeking user may transmit a signal that includes the seeking user's unique ID to the matching user's unique ID to indicate the match, (see step 86). Both users' portable user devices then may store the other user's unique ID in the memories 46 and the processors 56 may monitor the received signals for that ID to track the other user's signal, (see step 88). Next, the processors 56 may evaluate the strength of the other user's signal to assess the relative distance between the users, (see step 90). The processors 56 then may instruct the match indicators 52 to signal the match to the users with a signal intensity that corresponds to the relative distance between the users, (see step 92). The processors 56 continue to evaluate the intensity of the other user's signal and instruct the match indicator 52 to increase or decrease the intensity of the match indication signal correspondingly, (see step 94), such that the users know if they are getting closer or farther away from each other. When the processors 56 determine that the other user's signal is intense enough to indicate that the other user is within a relatively short distance, which may be pre-determined by each user and stored in each user's profile and/or the memories 46, the processors 56 may instruct the match indicators 52 to create a type of signal that indicates the short distance between the users to the users. The users may then locate each other and initiate a meeting, (see step 96), if desired.

Figure 4:
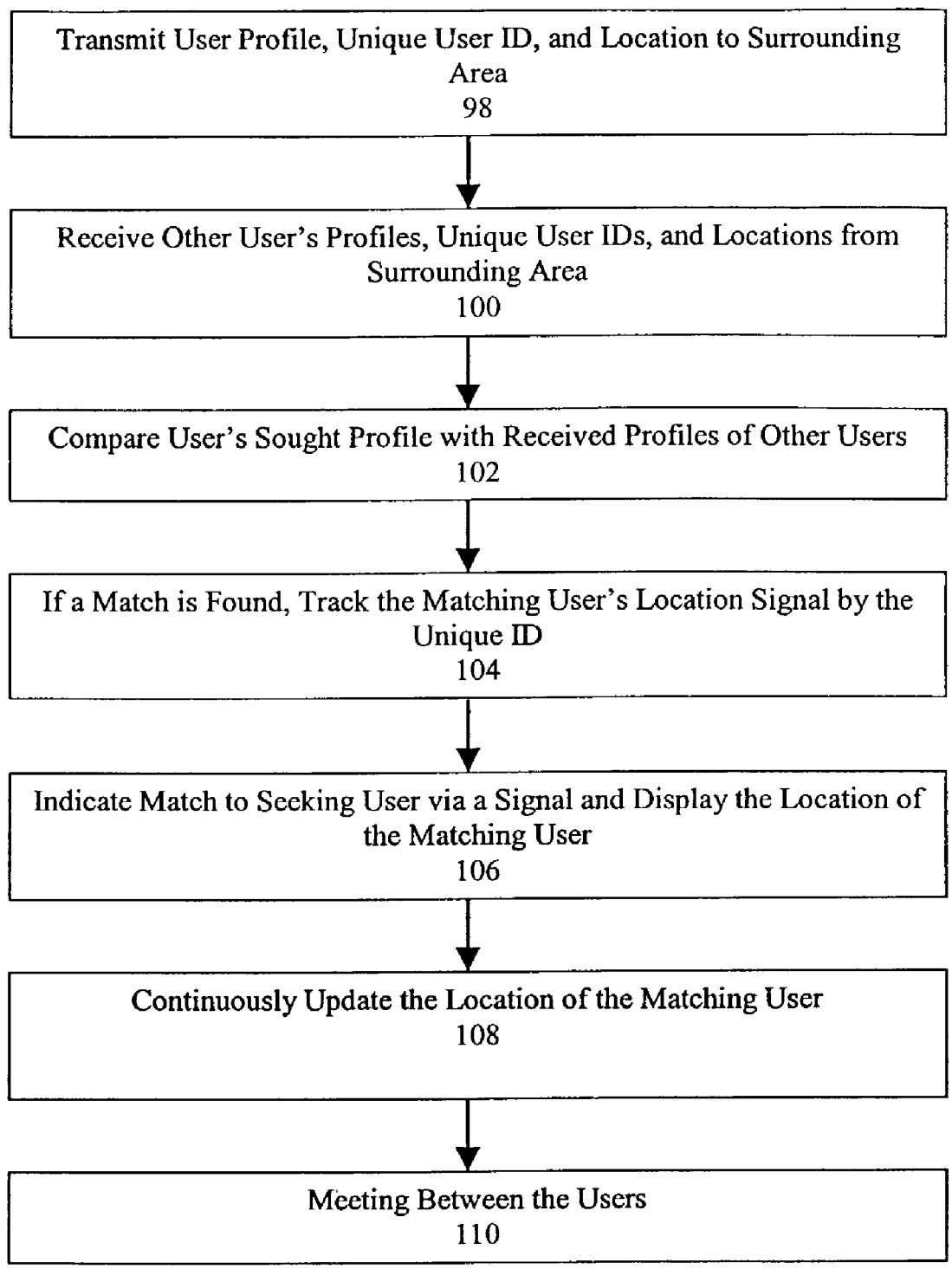
FIG. 4 is an operational diagram illustrating a method for locating user's having matches according to another embodiment of the present invention using a GPS system.

FIG. 4 illustrates an embodiment of the method and system of the present invention that includes portable user devices with GPS 58 functionality. As discussed hereinabove, users, after biometric verification, may activate their portable user devices, which enable the devices to begin transmitting their accessible profile information, unique user IDs, and location information, in addition to receiving other users' accessible profile information, unique user IDs, and location information, (see steps 98 and 100). The received user profiles are compared with the receiving user's sought profile, (see step 102). If a match is found, the portable user device may store the matching user's unique ID in the memory 46 and the processor 56 may monitor the received signals for that ID to track the matching user's location, (see step 104). The processor 56 may then instruct the match indicator 52 to signal the match to the seeking user and may display the location of the matching user on the display 54 of the portable user device, (see step 106). The processor 56 continues to track the matching user's location signal and updates the display 54 accordingly, (see step 108). The seeking user may then locate the matching user and initiate a meeting between the users, (see step 110), if desired. In the same way the embodiment of FIG. 3 describes the users locating each other, the embodiment of FIG. 4 may be modified to include the matching user also receiving the unique ID and location information of the seeking user, such that the users may locate each other and initiate a meeting, if desired.

Figure 5:
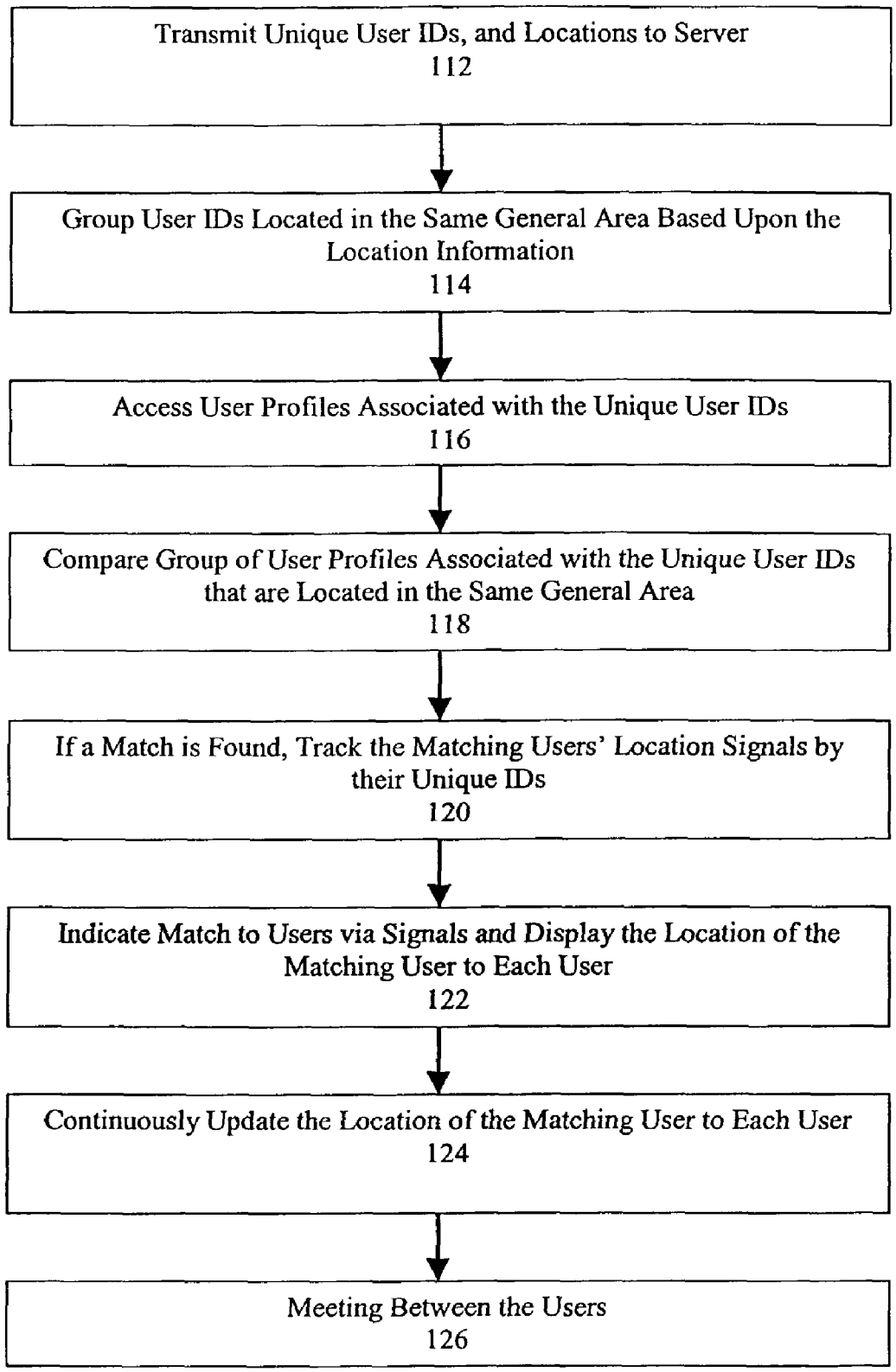
FIG. 5 is an operational diagram illustrating a method for locating user's having matches according to another embodiment of the present invention using a remote server to guide the users to one another.

The embodiment of the method and system of the present invention of FIG. 5 illustrates the manner in which a remote server may determine and notify matching users that are located in the same general area. Users may activate their portable user devices having GPS functionality and transmit their location information along with their unique user IDs to the remote server, (see step 112). The remote server receives the location information and user IDs via the wireless network 20 that is in communication with the network 12. The server then evaluates the location information and groups the user IDs based upon the location information, (see step 114). The server may evaluate the location information by comparing the location information to predetermined areas and/or predetermined distances, such that users in the same general area are grouped together. Thus, a user may be part of more than one group based upon the relative distance between that user and other users in surrounding areas. The server accesses the user profiles associated with the unique user IDs for each group, (see step 116). The user profiles may be located on the server or another server or database that is also in communication with network 12. The server compares the user profiles in each group, (see step 118). If the server discovers a match, the server records the matching user IDs and begins tracking their user IDs for their location signals, (see step 120). The server transmits signals to the users' portable user devices that instruct the match indicator 52 to signal the match to the users and may display the location of the other user on the display 54 of each user's portable user device, (see step 122). Alternatively, the server may transmit the match signal only to the user whose sought profile is matched and that user may receive the location information of the matching user in the same manner as discussed regarding FIG. 4. The server continues to track the users location signals and update the displays 54 accordingly, (see step 124). The users may then locate each other and initiate a meeting, (see step 126), if desired.

Furthermore, users may transmit a signal associated with their unique user IDs, from a personal computer 14 or their portable user device to a server that is in communication with the network 12, indicating that they want their user profiles to be compared to all of the other user profiles of system 10. Users may specify in their profiles whether they permit their accessible profile to be globally compared in this way, and, if so, how the users want matching to users to contact them. The server, utilizing the comparison software that is located on that server or another server in communication with the network 12, compares the requesting user's profile to all of the other user profiles that permit such a global comparison. If the server locates a match or matches, then the server will transmit that information and the predetermined contact information for the matching user(s) to the requesting user. The requesting user's contact information may also be transmitted to the matching users if the requesting user so desires. The contact information may be displayed in the portable user devices, if they have displays 54, or to a predetermined email address, street address, post office box, telephone number, voice mailbox, or any other type of transmission to the particular user. Once the users have the contact information, they may initiate a meeting, if desired.

The devices of the present inventions may also allow for user's to transmit messages to one another. For example, a user of one device may construct an email type message and sent it to the owner of another device. This messaging could also be used to locate people who have been indicated as a match. For example, if someone has been indicated as a match, using the ID of the matching user that was sent with the indication of the match, the seeker could send a message to the match's location indicating the seeker current location or a message of where they may meet. For example, a coin seller may find a match to a person interested in buying coins. The coin seller could the address of his or her place of business to the match or send information about the types of coins they have available.

In all of the embodiments described above, the users may verify their ownership of the portable user device and the user profile associated with the device that matched with the other user's profile through the biometric security system that is included in the portable user devices. In addition, all of the examples described above apply to specific application examples that include users seeking other users for the purpose of sharing common interests and/or dating, for the purpose of obtaining specific information, such as other users' interest in buying or selling something, and for the purpose of locating other users that can assist in an emergency situation.

Figure 6:
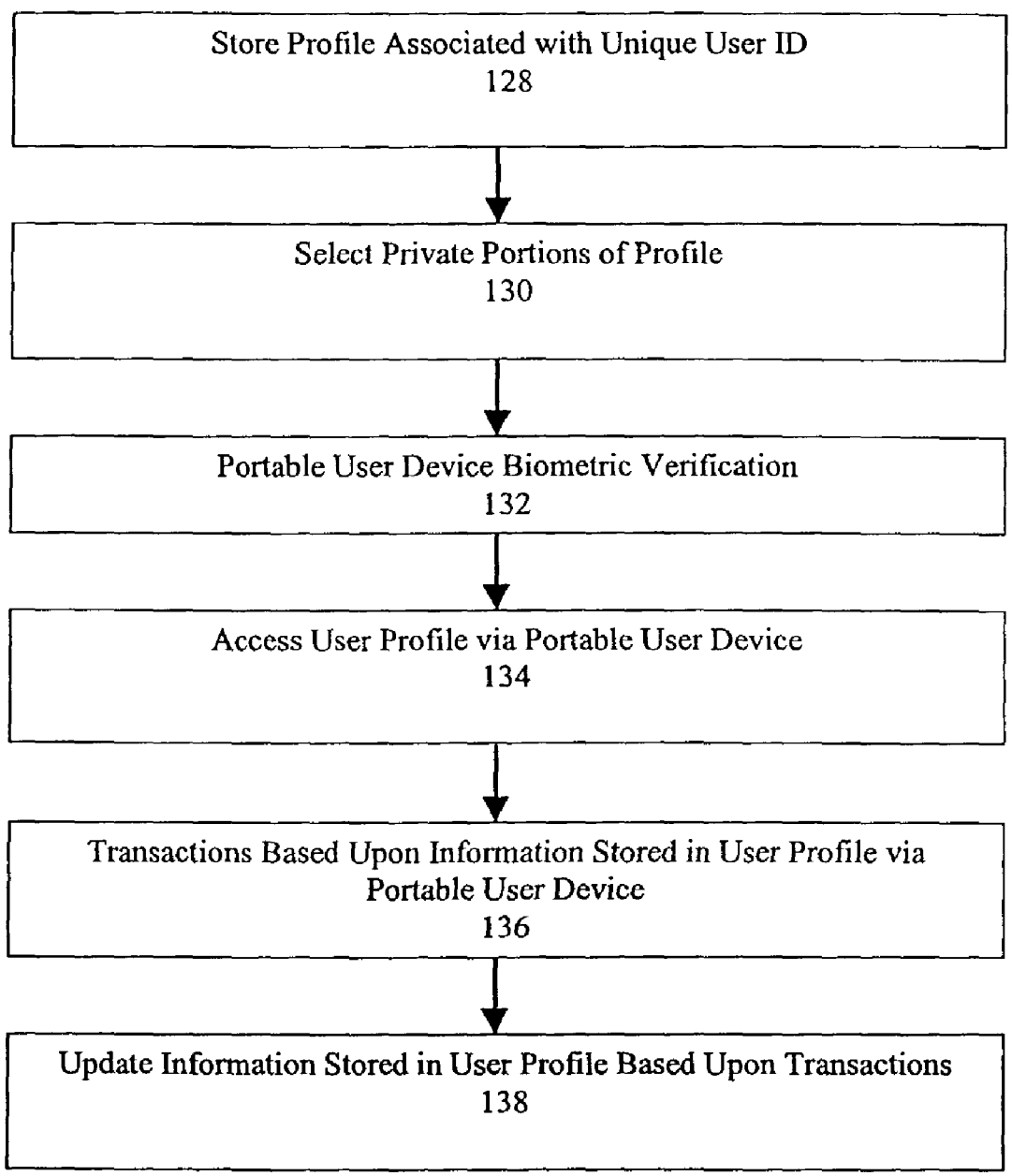
FIG. 6 is an operational diagram illustrating the portable user devices used to access user private profile information and engage in various financial or other types of transactions via the transmission and/or reception of user profile data according to one embodiment of the present invention.

Moreover, the embodiment of the system and method of FIG. 6 illustrates that the portable user devices may be employed by users to access their private profile information and engage in various financial or other types of transactions via the transmission and/or reception of their profile data by the devices. Users store their profile containing any type of personal information or links to their person information, which may include physical descriptions, financial information, bank records, criminal records, medical records, and/or any other type of user information, in a server 16, (see step 128). Users then may select the portions of their profile that they wish to keep private and the portions that they wish to allow other users to access, (see step 130). Users may access their profile via their portable user devices, whether the device accesses the profile stored in the server 16 or whether the profile is transmitted to and stored in the portable user device as described hereinabove. Before users may access the private portions of their profile via their portable user devices, however, they must verify their biometric by the biometric sensors 50, (see step 132). If the user passes the biometric verification, the user has access to all portions of the user's stored profile and may engage in transactions using the profile information, (see steps 134 and 136). For example, the user may wish to transfer money from one bank account to another. The user may do so by transmitting the appropriate signals to a receiver associated with the bank(s) and the bank (s) may transmit confirmation of the transaction to the portable user device. Each transaction may be recorded in the memory 46 of the devices and/or a remote server that is in communication with the network 12 and, following each transaction, the user profiles may be updated accordingly, (see step 138).

Thus, the method and system of the present invention provide an efficient manner in which users may securely store all of their personal electronic information in a central repository, securely access the information from a remote location via portable user devices, select portions of their profile information to share with other users, locate other users having accessible profiles that match selected criteria, and execute transactions utilizing their profile via their portable user devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A system for comparing user profiles to determine users having matching interests and biometrically verifying the identity and information of the matching users to each other as part of a comparison of user profile information search, comprising:
    a storage device comprising a user profile database comprising user profile information for a plurality of users;
    a user device associated with said storage device, said user device comprising a user interface for receiving user profile information from the user;
    a biometric verification interface for biometrically verifying each user to the user's associated profile information stored in said user profile database; and
    a processing element in communication with said user interface, biometric interface, and storage device, wherein said processing element:
    receives user profile information input by each user via said user interface including user preferences regarding other users;
    stores the user profile information for each user in the user profile database, wherein one or more of the user profile information for each user is biometrically associated with a respective third party institution and can be verified by the third party institution, wherein the user profile information associated with third party institutions is stored in both the user profile database and a third party database associated with the respective third party institution, where the user profile database and the third party database associated with the third party institution are separate databases;
    performs a user profile information pre-verification for each user by contacting third party institutions associated with the respective user profile information to verify the user profile information stored in the user profile database, such that the user profile information is verified by the third party institution prior to use;
    compares user preferences for each user stored in the user's profile information with the user preferences of the other of the plurality of users;

returns only those user profiles for users having matching user preferences, so that only users are indicated in the comparison that have common interests; and allows via the user interface each of the users that were indicated as matching to access user profile information stored in the user profile database for the other user, including access to the user profile information verified by the third party institution prior to use, such that mutual access by the users to the other user's verified user profile information is provided;

wherein the system biometrically links all users to each other and to their respective institutions so that their associated biometrically verified information is permitted to be searched by others to find the best mutual matches for any enquiring user; and wherein the biometrically linking comprises storing a user's biometric on the user's own device and on other users' devices and requiring a user to have their biometric scanned by and verified by the other user's device to protect against tampering.

2. A system according to claim 1, wherein the user profile information comprises at least one clickable/selectable direct electronic link to user profile information associated with the user that is stored on a third party database of a third party institution, such that the user profile information associated with the user may be verified by accessing the clickable/selectable direct electronic link.

3. A system according to claim 1, wherein said storage device is a central storage device accessible via a network.

4. A system according to claim 1, wherein portions of at least some of the user profile information stored in said user profile database is designated as information that can be accessed by other users.

5. A system according to claim 1, wherein the user profile information stored in said user profile database is stored in a web page that includes links to biometrically verified information regarding the user.

6. A system according to claim 1, wherein said user device comprises a plurality of user devices each associated with a respective user and each comprising a network interface for communicating with said storage device via a network.

7. A system according to claim 6, wherein said biometric interface comprises a plurality of biometric interfaces each located in a respective user device.

8. A system according to claim 6, wherein said user device is one of a cell phone, personal digital assistant, or personal computer.

9. A system according to claim 6, wherein said user device comprises a GPS device for tracking the location of said user interface.

10. A system according to claim 9, wherein said GPS device comprises a transceiver for transmitting a location of said user interface.

11. A system according to claim 1 wherein said processing element further performs a user profile comparison with other users and providing a list of one or more second users having user profile information that matches user profile information associated with the first user, and wherein said processing element allows each user to create different user profiles to be used in the searches.

12. A system according to claim 11 further comprising a transceiver associated with each user device, wherein said transceiver transmits user profile information in a geographic area surrounding the user device and receives user profile information from other user devices in the geographic area, and wherein said processing element further compares user profile information received from another user device with selected search criteria set by the user of the user device, and indicates a match if there is a match between the user profile information received from another user device with the selected search criteria.

13. A system for comparing user profiles to determine users having matching interests and biometrically verifying the identity and information of the matching users to each other as part of a comparison of user profile information, comprising:

a storage device comprising a user profile database comprising user profile information for a plurality of users;

a user device associated with said storage device, said user device comprising a user interface for receiving user profile information from the user;

a biometric verification interface for biometrically verifying each user to the user's associated profile information stored in said user profile database; and a processing element in communication with said user interface, biometric interface, and storage device, wherein said processing element:

receives user profile information input by each user via said user interface;

stores the user profile information for each user in the user profile database, wherein one or more of the user profile information for each user is biometrically associated with a respective third party institution and can be verified by the third party institution, wherein the user profile information associated with third party institutions is stored in both the user profile database and a third party database associated with the respective third party institution, where the user profile database and the third party database associated with the third party institution are separate databases;

performs a user profile information pre-verification for each user by contacting third party institutions associated with the respective user profile information to verify the user profile information stored in the user profile database, such that the user profile information is verified by the third party institution prior to use;

compares user profile information for each user with the user profile information of the other of plurality of users;

returns only those user profiles for users having matching interests, so that only users are indicated in the comparison that have common interests;

allows via the user interface each of the users that were indicated as matching to access user profile information stored in the user profile database for the other user, including access to the user profile information verified by the third party institution prior to use, such that mutual access by the users to the other user's verified user profile information is provided; and wherein said processing element further allows a user to create different user profiles with different user profile information associated with the user to share with other users and/or for use in performing comparisons with other user's profiles to thereby facilitate different matches with different users based on different user profiles;

wherein the system biometrically links all users to each other and to their respective institutions so that their associated biometrically verified information is permitted to be searched by others to find the best mutual matches for any enquiring user; and wherein the biometrically linking comprises storing a user's biometric on the user's own device and on other users' devices and requiring a user to have their biometric scanned by and verified by the other user's device to protect against tampering.

14. A system for comparing user profiles to determine users having matching interests and biometrically verifying the identity and information of the matching users to each other as part of a comparison of user profile information, comprising:

a storage device comprising a user profile database comprising user profile information for a plurality of users;

a user device associated with said storage device, said user device comprising a user interface for receiving user profile information from the user;

a biometric verification interface for biometrically verifying each user to the user's associated profile information stored in said user profile database; and a processing element in communication with said user interface, biometric interface, and storage device, wherein said processing element:

receives user profile information input by each user via said user interface; stores the user profile information for each user in the user profile database, wherein one or more of the user profile information for each user is biometrically associated with a respective third party institution and can be verified by the third party institution, wherein the user profile information associated with third party institutions is stored in both the user profile database and a third party database associated with the respective third party institution, where the user profile database and the third party database associated with the third party institution are separate databases;

performs a user profile information pre-verification for each user by contacting third party institutions associated with the respective user profile information to verify the user profile information stored in the user profile database, such that the user profile information is verified by the third party institution prior to use;

compares user profile information for each user with the user profile information of the other of plurality of users;

returns only those user profiles for users having matching interests, so that only users are indicated in the comparison that have common interests;

allows via the user interface each of the users that were indicated as matching to access user profile information stored in the user profile database for the other user, including access to the user profile information verified by the third party institution prior to use, such that mutual access by the users to the other user's verified user profile information is provided; and allows a user to create search request for use in performing searches of other user profiles, wherein said processing element allows the user to weight different search criteria in the search request by different weighting values to selectively weight the importance of each search criteria to the user;

wherein the system biometrically links all users to each other and to their respective institutions so that their associated biometrically verified information is permitted to be searched by others to find the best mutual matches for any enquiring user; and wherein the biometrically linking comprises storing a user's biometric on the user's own device and on other users' devices and requiring a user to have their biometric scanned by and verified by the other user's device to protect against tampering.

15. A system for biometrically verifying the identity and information of first and second users to each other as part of a user profile comparison, comprising:

a storage device comprising a user profile database comprising user profile information for two users;

a user device associated with each user and with said storage device, said user device comprising a user interface for receiving user profile information from the associated user;

a biometric verification interface associated with each user interface for biometrically verifying each user to the user's associated profile information stored in said user profile database; and a processing element associated in communication with said user interfaces, biometric interfaces, and storage device, wherein said processing element:

receives user profile information input by each user via said user interface;

stores the user profile information for each user in the user profile database, wherein one or more of the user profile information for each user is biometrically associated with a respective third party institution and can be verified by the third party institution, wherein the user profile information associated with third party institutions is stored in both the user profile database and a third party database associated with the respective third party institution, where the user profile database and the third party database associated with the third party institution are separate databases; and performs a user profile information pre-verification for each of the two users by contacting third party institutions associated with the respective user profile information to verify the user profile information stored in the user profile database, such that the user profile information is verified by the third party institution prior to use, wherein said user interfaces in communication with said processing element further:

allows each user associated with each user interface to perform searches of user profile information based on selected search criteria;

compares user profile information for each user with the user profile information of the other of plurality of users;

returns only those user profiles for users having matching interests, so that only users are indicated in the comparison that have common interests; and allows each user to access user profile information stored in the user profile database for another user, including access to the user profile information verified by the third party institution prior to use, such that mutual access of user profile information is provided, wherein neither user has more control than the other user regarding review of user profile information;

wherein the system biometrically links all users to each other and to their respective institutions so that their associated biometrically verified information is permitted to be searched by others to find the best mutual matches for any enquiring user; and wherein the biometrically linking comprises storing a user's biometric on the user's own device and on the other users' device and requiring a user to have their biometric scanned by and verified by the other user's device to protect against tampering.

16. A system for biometrically verifying the identity and information of first and second users to each other as part of a comparison of user profile information, comprising:

a user device associated with each user, comprising:

a storage device comprising a user profile database comprising user profile information for the user;

a user interface for receiving user profile information from the user;

a biometric verification interface for biometrically verifying the user to the user's associated profile information stored in said user profile database; and a processing element in communication with said user interface, biometric interface, and storage device, wherein said processing element:

receives user profile information input by the user via said user interface;

stores the user profile information in the user profile database, wherein one or more of the user profile information is biometrically associated with a respective third party institution and can be verified by the third party institution, wherein the user profile information associated with third party institutions is stored in both the user profile database and a third party database associated with the respective third party institution, where the user profile database and the third party database associated with the third party institution are separate databases;

performs a user profile information pre-verification for each of the two users by contacting third party institutions associated with the respective user profile information to verify the user profile information stored in the user profile database, such that the user profile information is verified by the third party institution prior to use;

compares user profile information for the first and second users;

determines whether the first and second users have matching interests; and allows via the user interface each of the two users to access user profile information stored in the user profile database for the other user, including access to the user profile information verified by the third party institution prior to use, such that mutual access by the two users to the other user's verified user profile information is provided; and wherein said user interface, biometric verification interface, and processing element are portable, and wherein said biometric verification interface verifies a user as associated with a user interface to another user in an in-person transaction between users, wherein such verification assures each user that the other user is biometrically verified to the user interface in the user's possession and with the user profile information stored in the user interface in the user's possession;

wherein the system biometrically links all users to each other and to their respective institutions so that their associated biometrically verified information is permitted to be searched by others to find the best mutual matches for any enquiring user; and wherein the biometrically linking comprises storing a user's biometric on the user's own device and on the other users' device and requiring a user to have their biometric scanned by and verified by the other user's device to protect against tampering.

\* \* \* \* \*